(12) United States Patent
St. John Brislin

(10) Patent No.: US 11,423,944 B2
(45) Date of Patent: Aug. 23, 2022

(54) METHOD AND SYSTEM FOR GENERATING AUDIO-VISUAL CONTENT FROM VIDEO GAME FOOTAGE

(71) Applicant: Sony Interactive Entertainment Europe Limited, London (GB)

(72) Inventor: Simon Andrew St. John Brislin, London (GB)

(73) Assignee: Sony Interactive Entertainment Europe Limited

( * ) Notice: Subject to any disclaimer, the term of this patent is extended or adjusted under 35 U.S.C. 154(b) by 289 days.

(21) Appl. No.: 16/750,447

(22) Filed: Jan. 23, 2020

(65) Prior Publication Data

US 2020/0251146 A1 Aug. 6, 2020

(30) Foreign Application Priority Data

Jan. 31, 2019 (GB) .................................. 1901322

(51) Int. Cl.
*H04N 9/80* (2006.01)
*G11B 27/036* (2006.01)
(Continued)

(52) U.S. Cl.
CPC .......... *G11B 27/036* (2013.01); *A63F 13/497* (2014.09); *A63F 13/86* (2014.09);
(Continued)

(58) Field of Classification Search
USPC .................................................. 386/248, 278
See application file for complete search history.

(56) References Cited

U.S. PATENT DOCUMENTS 8,591,332 B1 * 11/2013 Bright .................... A63F 13/46
463/35
9,886,965 B1 * 2/2018 Ahmet .................... G10H 1/44
(Continued)

FOREIGN PATENT DOCUMENTS

WO 2004081940 A1 9/2004

OTHER PUBLICATIONS

Extended European Search Report with Written Opinion for Application No. 20154861.7 dated Jul. 2, 2020, 8 pages.
(Continued)

Primary Examiner — Nigar Chowdhury
(74) Attorney, Agent, or Firm — Lerner, David, Littenberg, Krumholz & Mentlik, LLP

(57) ABSTRACT

A method of generating audio-visual content from video game footage is provided. The method comprises obtaining a user-selected audio track and obtaining video game footage. Statistical analysis is performed on the audio track so as to determine an excitement level associated with respective portions of the audio track. Statistical analysis is performed on the video game footage so as to determine an excitement level associated with respective portions of the video game footage. Portions of the video game footage are matched with portions of the audio track, based on a correspondence in determined excitement level. Based on said matching, a combined audio-visual content comprising the portions of the video game footage matched to corresponding portions of the audio track is generated. In this way, calm and exciting moments within the video footage are matched to corresponding moments in the audio track. A corresponding system is also provided.

24 Claims, 7 Drawing Sheets

(51) Int. Cl.
*A63F 13/497* (2014.01)
*A63F 13/86* (2014.01)
*G10L 21/10* (2013.01)
*G10L 25/21* (2013.01)
*G11B 27/32* (2006.01)
*G06V 20/40* (2022.01)
*H04N 5/93* (2006.01)
*G11B 27/00* (2006.01)

(52) U.S. Cl.
CPC ............ *G06V 20/41* (2022.01); *G06V 20/46* (2022.01); *G10L 21/10* (2013.01); *G10L 25/21* (2013.01); *G11B 27/326* (2013.01); *A63F 2300/554* (2013.01); *A63F 2300/577* (2013.01)

(56) References Cited

U.S. PATENT DOCUMENTS

| | | | | |
|---|---|---|---|---|
| 10,130,884 | B1* | 11/2018 | Friedman | A63F 13/50 |
| 10,952,011 | B1* | 3/2021 | Zappa | G10H 1/0091 |
| 2006/0059120 | A1* | 3/2006 | Xiong | G06F 16/7834 |
| 2006/0204214 | A1* | 9/2006 | Shah | G11B 27/036 |
| | | | | 386/282 |
| 2007/0192099 | A1* | 8/2007 | Suzuki | G10L 25/48 |
| | | | | 704/240 |
| 2008/0193016 | A1* | 8/2008 | Lim | G06K 9/00711 |
| | | | | 382/190 |
| 2008/0287821 | A1* | 11/2008 | Jung | G16H 10/20 |
| | | | | 600/544 |
| 2010/0067798 | A1* | 3/2010 | Hung | G06K 9/00268 |
| | | | | 382/190 |
| 2011/0063317 | A1* | 3/2011 | Gharaat | G06F 16/41 |
| | | | | 345/545 |
| 2013/0343727 | A1* | 12/2013 | Rav-Acha | G11B 27/34 |
| | | | | 386/282 |
| 2015/0195426 | A1* | 7/2015 | Merrill | G11B 27/28 |
| | | | | 348/500 |
| 2015/0338917 | A1* | 11/2015 | Steiner | A61B 5/316 |
| | | | | 345/156 |
| 2016/0071550 | A1* | 3/2016 | Daub | H04N 5/77 |
| | | | | 386/228 |
| 2016/0105708 | A1* | 4/2016 | Packard | H04N 21/23439 |
| | | | | 725/10 |
| 2016/0224803 | A1* | 8/2016 | Frank | G06F 16/24578 |
| 2016/0247328 | A1* | 8/2016 | Han | H04N 21/4394 |
| 2017/0110151 | A1* | 4/2017 | Matias | G06K 9/00758 |
| 2017/0157512 | A1* | 6/2017 | Long | A63F 13/86 |
| 2017/0228600 | A1 | 8/2017 | Syed et al. | |
| 2018/0024626 | A1* | 1/2018 | Sanger | G06T 19/006 |
| | | | | 463/13 |
| 2018/0078862 | A1 | 3/2018 | Schleicher | |
| 2018/0176168 | A1* | 6/2018 | Tsou | H04L 51/08 |
| 2018/0295427 | A1* | 10/2018 | Leiberman | H04N 21/8166 |
| 2019/0091576 | A1 | 3/2019 | Taylor et al. | |
| 2019/0213423 | A1* | 7/2019 | Haberstroh | H04W 4/021 |
| 2019/0289372 | A1* | 9/2019 | Merler | G06N 3/04 |
| 2019/0341026 | A1* | 11/2019 | Visser | G10L 15/1815 |
| 2020/0090701 | A1* | 3/2020 | Xu | H04N 21/47205 |
| 2020/0221191 | A1* | 7/2020 | Baughman | H04N 21/8549 |
| 2020/0311433 | A1* | 10/2020 | Oz | G06F 16/739 |

OTHER PUBLICATIONS

Combined Search Report and Examination for Application No. GB1901322.6 dated Aug. 6, 2019, 4 pages.

Mcfee, et al., "Librosa: Audio and music signal analysis in python," Proceedings of the 14th Python in Science Conference Jul. 6, 2015, pp. 18-25 (vol. 8).

Sato, et al., "A soundtrack generation system to synchronize the climax of a video clip with music," IEEE International Conference on Multimedia and Expo (ICME), published Jul. 11, 2016, IEEE, pp. 1-6.

* cited by examiner

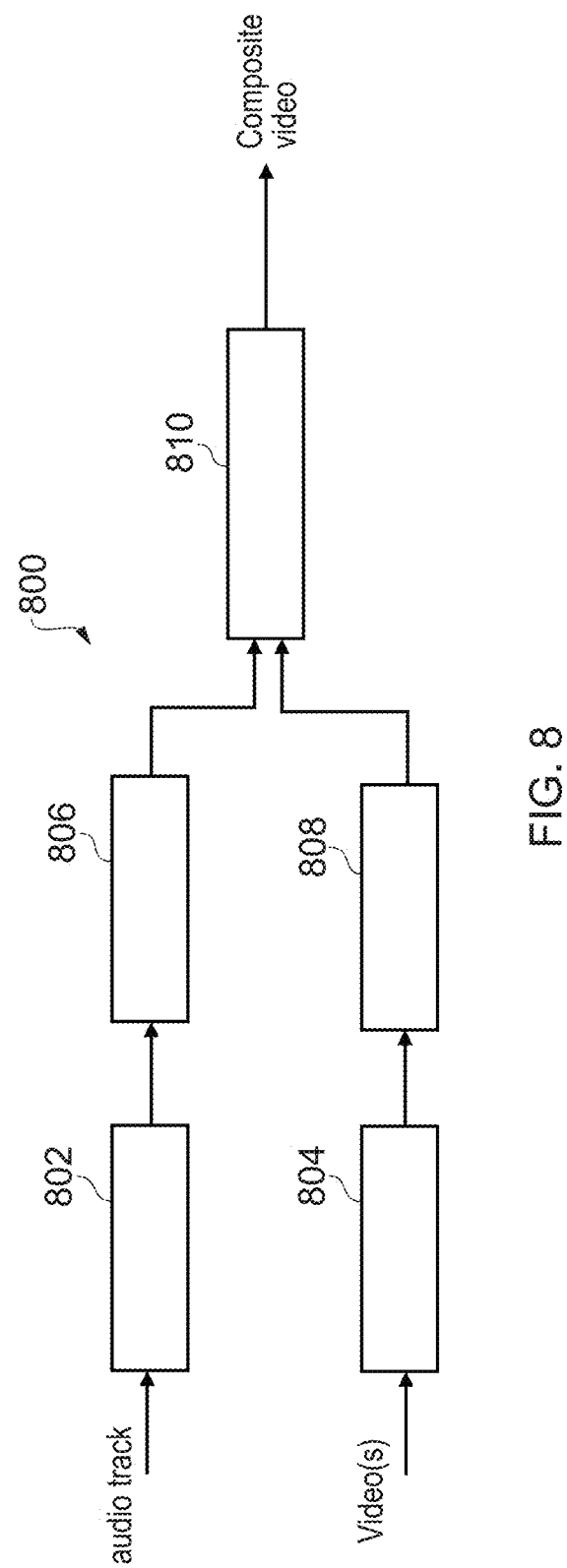

METHOD AND SYSTEM FOR GENERATING AUDIO-VISUAL CONTENT FROM VIDEO GAME FOOTAGE

CROSS-REFERENCE TO RELATED APPLICATIONS

The present application claims priority from Great Britain Application No. 1901322.6, filed on Jan. 31, 2019, the disclosure of which is hereby incorporated herein by reference.

BACKGROUND OF THE INVENTION

Field of the Invention

The present disclosure relates to a method of generating audio-visual content from video game footage and a system for generating audio-visual content from video game footage.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is often desirable to generate video content from video game footage. For example, at the end of a video game tournament, it may be desirable to generate a compilation video corresponding to any highlights, and/or bloopers that occurred within the video game tournament. In some cases, a player may simply wish to watch back of some their game play, be that for a single video gaming session or multiple sessions for the same or different video games. Currently, there are numerous online video channels that make use of video game footage, with some attracting more than 10 million followers.

Video content generated from video game footage may be enhanced by adding backing music. For example, it may be desirable to have particularly dramatic moments in video game footage matched with correspondingly dramatic moments in a musical track. Similarly, it may be desirable to have calmer moments within video game footage matched with calmer portions of the same musical track. The introduction of music often results in a far more engaging video for the viewer. More generally, a player may wish to generate a music video using their own or others' video game footage.

Usually, the creation of video content from video game footage is facilitated by post-processing software. For example, the PS4 provides 'SHAREfactory'™ in which players can edit videos of their gameplay captured by their PS4. Generally, software such as this allows users to import and edit video clips, as well as import audio for accompanying the imported video clips, so as to create a final video. Typically, the user will have to move and trim the different video clips within a timeline, so as to sync any highlight moments with correspondingly exciting parts of the imported audio (and likewise lowlight moments with calmer parts of the audio). Whether or not the video game footage is accompanied by the audio in an appropriate manner will normally be at the user's judgement. This can result in slight mismatches between highlight moments occurring within the video game footage and the parts of the audio that the user had intended to accompany those moments.

Some video editing software may provide information about a song that the user has imported, such as e.g. the timing of the beats. The user may then use this information to trim or position video clips on a timeline, such that the cuts and transitions in the video can be timed to beats in the song. However, creating video content in this way is still a somewhat labour intensive process for the user, and in some cases, the beats may not be necessarily indicative of whether a segment of a song actually corresponds to an 'exciting' part of the song.

The present invention seeks to alleviate these problems.

SUMMARY OF THE INVENTION

It is to be understood that both the foregoing general description of the invention and the following detailed description are exemplary, but are not restrictive, of the invention.

According to a first aspect disclosed herein, there is provided a method for generating audio-visual content from video game footage in accordance with any of claims 1 to 11.

According to a second aspect disclosed herein, there is provided a system for generating audio-visual content from video game footage in accordance with any of claims 13 to 25.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 shows schematically an example of a system for generating audio-visual content in accordance with the present disclosure.

DESCRIPTION OF THE EMBODIMENTS

Figure 1:
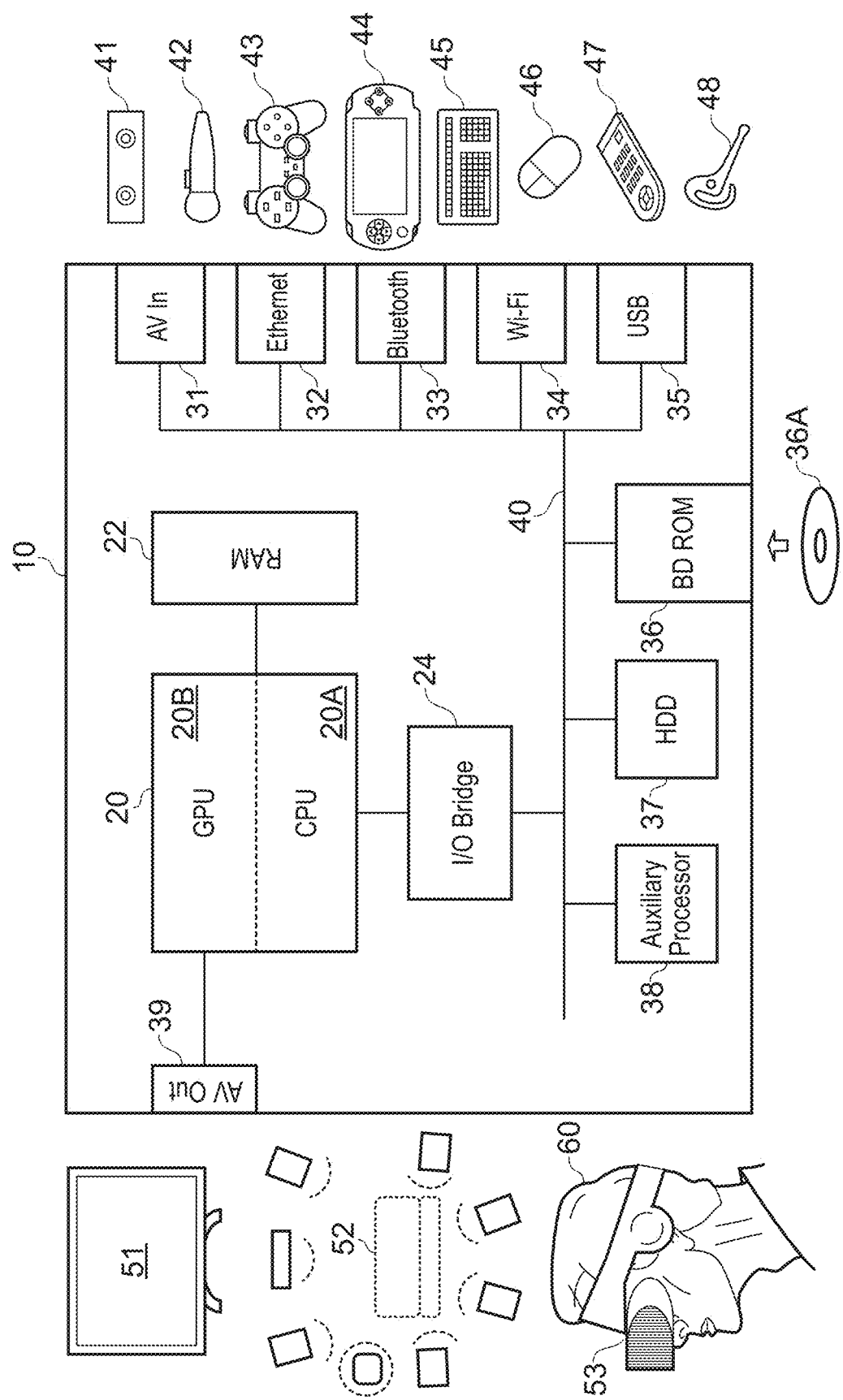
FIG. 1 shows schematically an example of a video game playing device.

Referring now to the drawings, wherein like reference numerals designate identical or corresponding parts throughout the several views, as an example of a videogame playing device, FIG. 1 schematically illustrates the overall system architecture of a Sony® PlayStation 4® entertainment device. It will be appreciated that the device shown in FIG. 1 is just an illustrative example, and that in some embodiments, the entertainment device may include a next generation console, such as a Sony® PlayStation 5® device.

A system unit 10 is provided, with various peripheral devices connectable to the system unit. The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discrete component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, 5 or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable 10 entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a microphone, speakers, mobile phone, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two.

The entertainment device may comprise a temporary buffer for storing video generated by the entertainment device during the playing of a video game. The temporary buffer may correspond to a ring buffer that is configured to cyclically record the last X minutes of video game footage, where X may correspond to e.g. 15 minutes.

Alternatively, or in addition, the entertainment device may be configured to transmit video generated during the playing of a video game to a server as a continuous video stream, via e.g. a Wi-Fi connection. The video may then be stored and processed at the server, for later retrieval by the entertainment device. As will be appreciated, the storage of video away from the entertainment device may mean that substantially longer than fifteen minutes of gameplay can be recorded at a time. The processing of the video game footage (be that local and/or remote) will be described further in the embodiments described herein.

The entertainment device may further comprise or have access to a listening unit (not shown) configured to automatically detect and capture recordings of highlight events occurring in a video game being played at or via the entertainment device. The listening unit may use, for example, machine learning to detect such highlight moments. An example of such a listening unit is described in application GB 1819865.5. The video clips corresponding to the highlight events may be stored in RAM at the entertainment device or retrieved from a server that is in communication with the entertainment device.

The entertainment device described in FIG. 1 is an example of a device that may be used for capturing video game footage.

As mentioned previously, a user may wish to match video game footage to music, so as to create a more engaging video. However, usually, this matching process requires at least some degree of manual intervention and results in a sub-optimal final video. It would be desirable if this matching could be performed automatically, with portions of the video game footage being matched to portions of the music corresponding in excitement level. This would mean for example, that exciting moments within the video game footage such as e.g. a player defeating an enemy, winning a match, crashing a car, creating an explosion, etc. could automatically be synced with parts of the music corresponding, for example, to a chorus, crescendo, solo, key change, etc. Similarly, less exciting moments in the video game footage (so called lowlights') could be matched to calmer portions of the same piece of music.

It would further be desirable if this matching could be performed in a manner that does not require any pre-determined knowledge of the video game (from which the video game footage originates) or the audio track to which that video game footage is to be matched. That is, it would be desirable if the matching process could be performed in a video game and song agnostic manner. A method for generating such video content will now be described in relation to FIG. 2.

Figure 2:
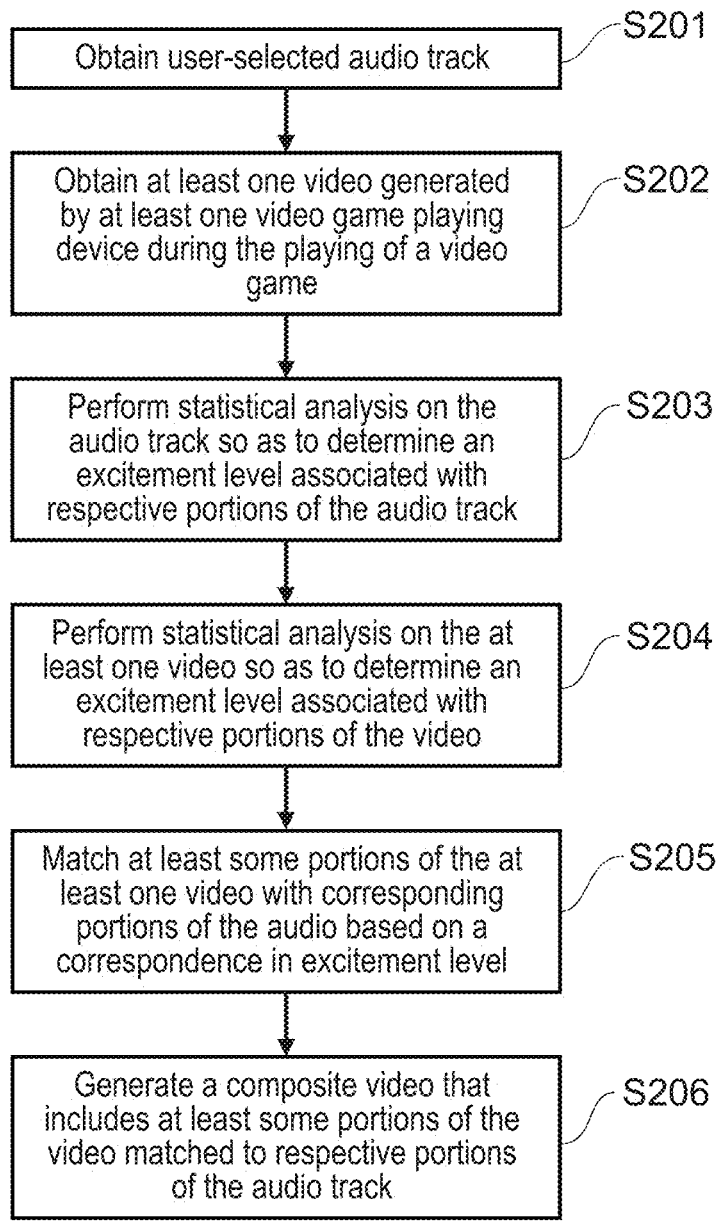
FIG. 2 shows schematically an example of a method for generating audio-visual content in accordance with the present disclosure.

FIG. 2 shows an example of a method for generating audio-visual content in accordance with the present invention. Here the term audio-visual content is used to describe a video comprising visual content (e.g. RGB or YUV video frames) and audio (e.g. a piece of music).

At a first step S201, a user-selected audio track is obtained. This may involve, for example, a user selecting a piece of music that they wish to use in creating a music video from video game footage. The music may correspond to e.g. an audio track that they have selected from their own collection or a music hosting service such as e.g. Spotify™, Apple Music™, Tidal™, etc. In some cases, the user may have uploaded a song or piece of audio that they have created themselves. For example, the audio track may correspond to music generated in the video game Dreams™, using the sound canvas. The selection of the audio may be provided as an option within a post-processing application, through which music videos in accordance with the present disclosure may be generated.

In some examples, the post-processing application may allow the user to select a portion of a song that they wish to be used in creating the music video, using e.g. a trimming tool. This may be appropriate where, for example, the user wishes to make a relatively short video, corresponding predominantly to highlights, and it may be therefore be undesirable to make use of e.g a 5-minute track.

In yet further or alternative examples, the user may upload multiple different tracks or portions of tracks for matching with respecting segments of video game footage.

At a second step S202, at least one video generated by at least one video game playing device during the playing of at least one video game is obtained. The video may comprise a plurality of RGB or YUV frames, for example. It will be appreciated that, whilst this is described as a second step, a user may import the audio and video into the post-processing application in any order. The at least one video may be obtained by a user having selected the one or more videos for importing into the post-processing application. The video may correspond to e.g. a .MPEG4 file, from which any audio output during the playing of the video game can be separated and muted, if so desired.

In some examples, the user may select a single video for matching to the imported audio. As described previously, the video game playing device may be configured to capture a single continuous recording of the last X minutes of a player's gameplay, and it may be this video that is used for matching with the imported audio track.

Alternatively, or in addition, the single video may correspond to a video that is not of the player's own gameplay, but of others, and that is accessible via a video sharing service, such as e.g. YouTube™ or Twitch™. For example, it may be possible to obtain a relatively long video, including gameplay of one or several different games, from one or several different players, that can be imported into the post-processing application.

In some examples, the user may select plural recordings of the video game gameplay that are to be used in creating a music video with the selected audio track. For example, the user may have a library of recordings, corresponding to moments within their gameplay that have been manually (e.g. via a 'SHARE' button) or automatically captured, over several video gaming sessions. The PS4's 'capture gallery' is an example of such a library in which these recordings may be held. A user may wish to generate a music video using e.g. all the recordings they have generated over a prolonged period, e.g. the last month. In some cases, a player may wish to generate a music video using video clips from a specific game and may therefore select recordings that are specific to that game.

It will be appreciated that in some examples, the selection of the video(s) may be facilitated through some level of automatic creation and categorisation. For example, videos may be categorised according to game and date, and it may be these videos from which the user is able to choose in creating a music video. Moreover, the selection step itself may involve a level of automation; for example, a user may simply select the game and or time period from which they wish to generate a music video, with the corresponding video clips automatically being imported into the post-processing application.

In additional or alternative examples, at least some of the plural video recordings may not correspond to the user's own video game footage. For example, a user may wish to generate a music video using video clips provided via a video hosting platform such as YouTube™ or Twitch™. In one example, the inventors found 15 hours of 'Lets Play' video clips to be suitable for matching to an audio track having a duration of three minutes.

In some embodiments, the user may wish to generate a music video for an offline or online (i.e. eSports) video game tournament. In such embodiments, the videos that are to be imported into the post-processing application may correspond to video game footage captured for each of the different players in the tournament. These video clips may be captured during the tournament (manually or automatically) and uploaded to e.g. a server, that the user is able to access. These video clips may then imported into the post-processing application, for use in generating a music video for that tournament.

Generally, it is preferred that the total duration of the video game footage used for matching with the audio track is relatively long, e.g. fifteen minutes or longer. For longer videos, it is more likely that the player will have encountered more varied environments and scenarios within the video game, meaning that there is a richer palette of highlight and lowlight moments to choose from when matching these with corresponding portions of the audio track. This will particularly be the case if the at least one video corresponds to a continuous stream of game play. The quality of the output video (i.e. matched with music) will generally be higher, the greater the duration of video footage available in creating the output video. In principle, the minimum total duration of the at least one video should be equal to the duration of the selected audio track (or trimmed version thereof) but could be shorter if repeat clips are permitted.

In short, access to more video provides more opportunities to find a good match with the audio, but for any amount of video a match (or at least a portion of video with a better score than other portions for a given musical section, as described later herein) can be found.

Returning to FIG. 2, at a third step S203, statistical analysis is performed on the audio track so as to determine an excitement level associated with respective portions of the audio track. This may involve, for example, separating the audio track into respective portions based on beat detection, with each portion comprising at least two beats. An example of such a method for detecting beats in the audio track is described at pages 18-23 of 'librosa: Audio and Music Signal Analysis in Python', Brian McFee, et. al. In one example, a 4:4 time signature may be assumed for the audio track with the track being separated such that each portion comprises four successive beats, i.e. such that each portion corresponds to a bar. In other examples, the time signature of the song may be estimated based on the beat detection using any suitable method, for example by counting the number of beats in a repeating pattern; the pattern itself may be detected for example from an autocorrelation in a low frequency band and optionally also a high frequency band over a period of a few seconds, the bands further optionally being outside the normal voiced speech frequency range.

The statistical analysis may comprise analysing the energy of the user-selected audio track so as to classify respective portions of the audio track in terms of an associated excitement level. This may involve, for example, determining what is characteristic of the overall audio track in terms of the overall spectrogram, and determining whether individual portions of the audio track deviate from this 'normal behaviour' by more than a threshold amount. A more detailed example of a technique for performing the statistical audio analysis will now be described in relation to FIGS. 3A-4.

Audio Statistical Analysis

Figure 3A:
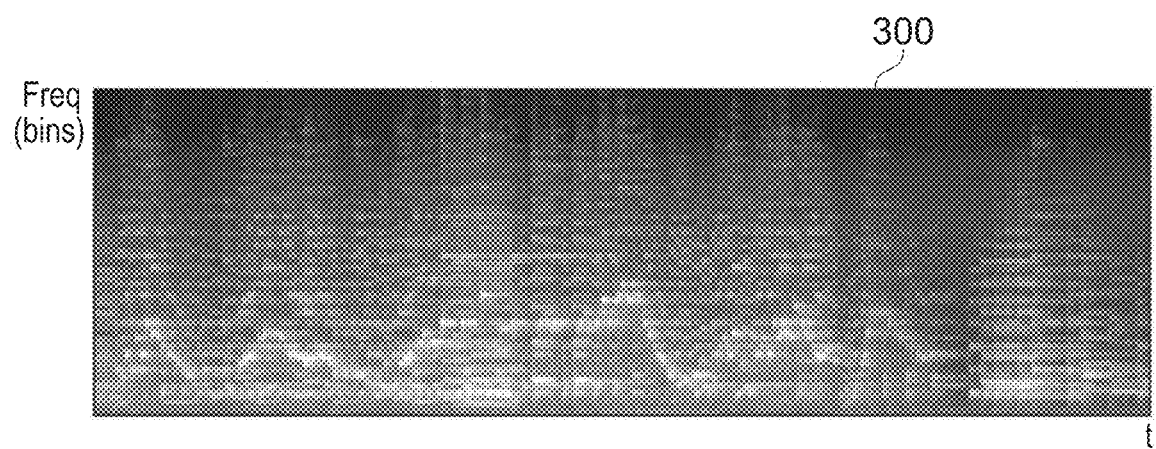
FIG. 3A shows an example of a spectrogram of an audio track.

FIG. 3A shows an example of a spectrogram generated for an audio track. In FIG. 3A, the x-axis represents a plurality of time intervals and the y-axis represents a plurality of different frequency intervals (i.e. frequency bins). The shading of the spectrogram represents the power at a particular time interval and for a particular frequency range. That is, the spectrogram comprises a plurality of buckets with the shading of each bucket representing the power of the audio track at that particular frequency range and at that particular time interval. Lighter shades represent more power whereas darker shades represent less power. In one example, the spectrogram may have 128 vertical buckets corresponding to 128 frequency ranges.

In the example shown in FIG. 3A, it can be seen that the power of the audio track is concentrated in the lower and mid-region of the frequency ranges (e.g. 20 to 20,000 Hz), with less power at the higher frequency ranges. In the art, the extent to which different frequencies of contribute to the power of an audio signal is sometimes described as the 'fullness'. A signal in which there is a low contribution of power from across several (or even all) frequencies is described as having a low fullness. A signal that exhibits significant power at a plurality of different frequencies is described as being full (or having a high fullness).

Figure 3B:
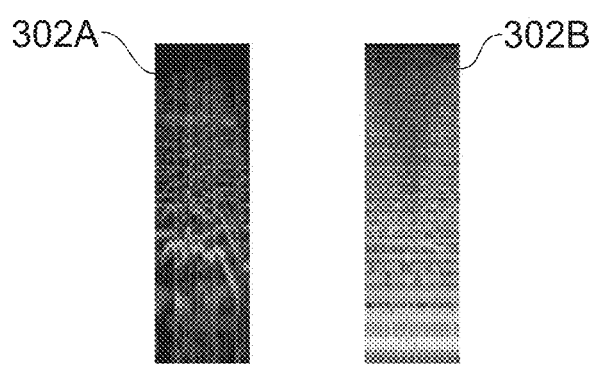
FIG. 3B shows an example of two portions of an audio track, each portion have a different fullness.

FIG. 3B shows an example of two different portions of the audio track having different fullnesses. In FIG. 3B, the portion of the audio signal on the right would be described as being more full than the portion of the audio signal on the left. Generally, full portions of an audio signal correspond to exciting parts of the audio track; whereas less full portions correspond to calmer parts of the audio track. By determining the fullness of different portions of an audio track, an excitement level associated with those portions can be determined.

As will be appreciated, variations in fullness will be relative to what is considered 'normal' for a given audio track. In some cases, the difference may not be as dramatic as that shown in FIG. 3B. For example, for an audio track consisting entirely of drumming, it may not be so obvious as to which parts of the track would be perceived by a listener as exciting relative to other portions of the audio track.

To deal with the variability in audio tracks, the statistical audio analysis may comprise determining a respective mean power and a standard deviation of the power of the audio track at a plurality of different frequency intervals. That is, for each frequency interval, and across all portions of the audio track (i.e. its entire duration), a mean power and standard deviation may be determined for that frequency interval. In FIG. 3A, this may simply involve adding the powers across a particular row (each row corresponding to a frequency interval) and dividing by the number of time intervals to obtain a mean power. This may be repeated for each row until a mean power and standard deviation has been obtained for each frequency interval. The standard deviation may be determined in a conventional manner. For example, by using the formula:

$$\sqrt{\frac{\sum |x_i - \mu|^2}{N}}$$

Where $\mu$ represents the mean power at a particular frequency range, N represents the number of time intervals, and $x_i$ represents a power at the frequency range at a respective time interval. If the audio track comprises a lot of e.g. bass drums, it may be expected that there will be a high mean in the buckets around 20-100 Hz.

In some examples, it may be assumed that each frequency can be modelled accurately using a Normal distribution. For example, the mean and standard deviation determined as above for a particular frequency range may be used to model the power of the audio track at that particular frequency range. Each portion (e.g. bar) of the audio track can then be analysed relative to this model, to determine whether the power of the audio track at that frequency significantly deviates from an expected power.

In some examples, the normal distribution may be used in a z-score calculation to determine whether the power at a particular frequency interval, for a given portion (e.g. bar) is typical or atypical for the audio track. This may involve, for example, generating a spectrogram of each respective portion of the audio track, and determining for each frequency interval, a mean power for that frequency interval across the portion. This mean power for the respective portion of the audio track may then be compared against the model for the corresponding frequency range, so as to determine a z-value for that frequency range. The z-value provides an indication of the number of standard deviations that the mean power at a particular frequency range of a particular portion of the audio track is relative to the overall mean power of the entire audio track, at that frequency range. The z-scores for each particular frequency range of a respective portion of the audio track can then be combined (e.g. summed) so as to determine an overall score indicating an excitement level associated with that portion of the audio track. This may be repeated for each respective portion of the audio track so that an excitement level can be determined for each respective portion.

It will be appreciated that, instead of calculating the mean power for each frequency interval of each portion, the total power at each frequency of interval of that portion could be used in determining z-scores. That is, the total power at each frequency interval could be compared against the mean total power of the track at that frequency interval and used to determine a corresponding z-score. These z-scores for each frequency interval of a given portion could then be combined so as to determine an overall excitement level.

Hence more generally a portion of an audio track may be considered exciting if it has a power level that is a predetermined level above a threshold (e.g. a mean power level, or a preset power level) within a predetermined number of frequency intervals (for example, each generated frequency interval, or a representative sample of intervals across the full frequency range), as evaluated on a per-interval basis or a total basis across the relevant intervals.

Figure 4:
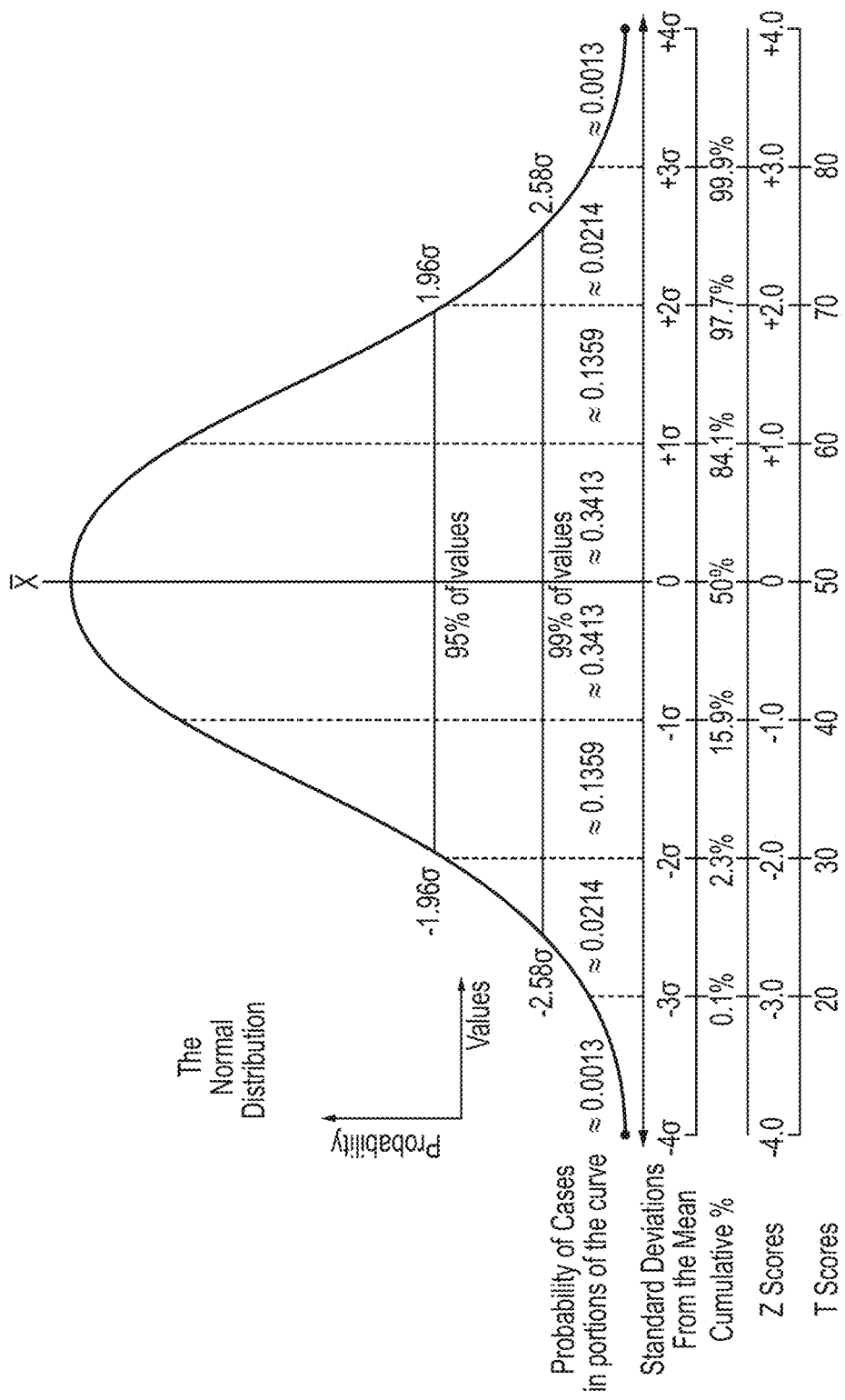
FIG. 4 shows an example of a normal distribution and corresponding z-scores.

FIG. 4 shows schematically an example of a normal distribution that may be used for modelling the power of the audio track at a particular a frequency range, and the corresponding z-scores that different points on the distribution correspond to.

A portion of the audio track may be identified as having a high excitement level if the combined z-score for that portion is equal to or exceeds a threshold value. Conversely, a portion of the audio track may be identified as having a low excitement level if the combined z-score for that portion is below a threshold value. The threshold value may be somewhat arbitrary, although it has been found by the inventors that a combined z-score that is equal to or greater than 0.25 is usually a good indicator of whether or not a portion of an audio track can be considered as having a high excitement level. Each portion of the audio track may be assigned an identifier indicating whether that portion of the audio track has been identified as having a high or low excitement level (i.e. the classification may be binary, with each portion being identified as exciting or calm). These identifiers may then be used so that videos corresponding in excitement level can be matched to different portions of the audio track, as will be described later.

As mentioned previously, in some examples, the spectrogram may comprise 128 frequency buckets, and therefore, for each portion of the audio track, the statistical analysis may involve determining 128 z-scores, one for each frequency interval. These scores may then be combined (e.g. summed) so as to determine how typical or atypical that portion of the audio track is relative to the entire audio track. Generally, a positive combined z-score is indicative that a given portion of the audio track has an above average fullness, whereas a negative z-score is indicative that a given portion of the audio track has a below average fullness.

It will be appreciated that, whilst the audio analysis has been described above in terms of a normal distribution and corresponding z-scores, any statistical method that enables the fullness of different portions of an audio track to be compared against an overall average fullness may be used to determine whether individual portions of the audio track are of a high or low excitement level.

Returning to FIG. 2, at a third step S203, statistical analysis is performed on the at least one video so as to determine an excitement level associated with respective portions of the at least one video. This may involve separating the video into respective portions for subsequent analysis. Generally, the at least one video will include a variety of different scenarios and environments within one or more video games and so it may be necessary to separate these somewhat so that the excitement level determined for a given portion is at least relative to a larger portion of video that corresponds to the same video game or moment within a given video game. For example, if the video is a relatively long continuous stream of a player playing for e.g. 2 hours, it may be that a large number of environments and situations are encountered, and therefore an overall colour analysis of the entire video may not be useful in determining where and when exciting moments are occurring within the video game. In some cases, 15 minutes may be selected as an arbitrary divider for splitting up the video, since e.g. if the video corresponds to a continuous stream of gameplay, it is less likely that a player will encounter e.g. an environment that differs vastly from that in which they have seen in the last fifteen minutes.

In examples where a plurality of videos have been obtained for creating the music video, the individual video files may form a natural means for separating the video into respective portions, and so there may not be an explicit step of splitting the videos into respective portions. However, in some examples, it may still be desirable to split these individual videos into respective portions, so that an excitement level associated with frames in these portions can be determined.

A more detailed example of a technique for performing the statistical analysis on the at least one video will now be described in relation to FIGS. 5-7.

Video Statistical Analysis

In some embodiments, the statistical analysis performed on the video may comprise determining for at least some frames in a respective portion of the video, a score indicating motion associated with those frames, in the respective portion. Generally, the more motion occurring within a portion of video, the more exciting the action occurring within that portion of video.

In some examples, the motion may be determined on a per-frame basis. For example, the motion associated with a given frame may be determined by taking the absolute difference in intensity values for each pixel in that frame relative to the same pixel in a preceding or subsequent frame. Pixels that are identical between successive frames will score 0, whereas pixels that go from pure white to pure black will score e.g. 255 (for e.g. a JPG or PNG image). The scores for each pixel of a given frame may then be summed so as to determine an overall motion score associated with that frame. If the image comprises e.g. 1280×720 pixels, then the motion can be determined by summing the 921,600 pixel scores together. A frame may be identified as comprising a lot of motion if the overall motion score exceeds a threshold value.

Figure 5:
FIG. 5 shows an example of successive video frames of a video game, and a frame representing the difference in pixel intensities between those frames.
Figure 6:
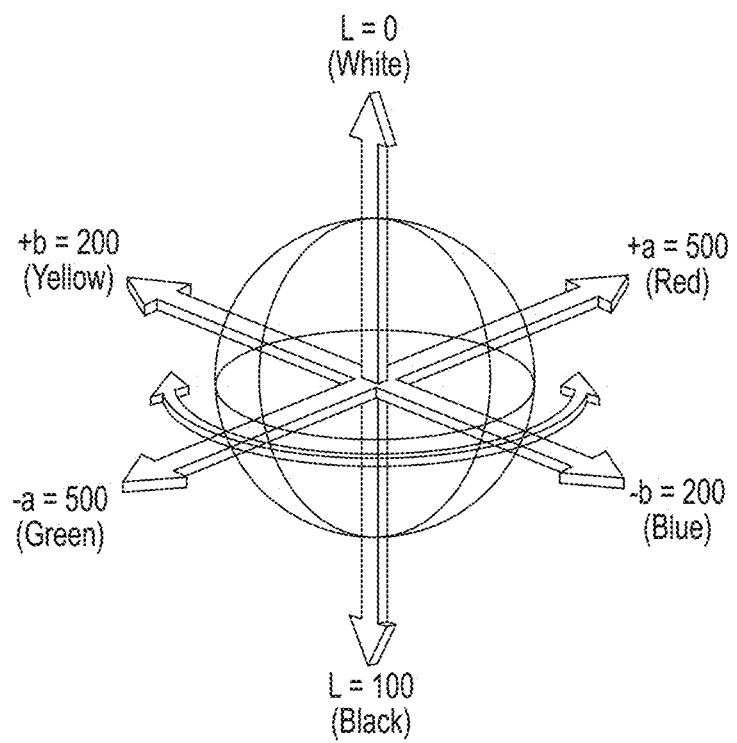
FIG. 6 shows schematically an example of the LAB colour space.

FIG. 5 shows an example of two successive video frames 502A, 502B from the game Uncharted 4™. In FIG. 5, a difference image 504 is also shown representing the different between individual pixel values between frame 502B and frame 502A. The difference image can then be converted into a numerical value (by summing the pixel values), so as to obtain a broad assessment of the motion associated with a given frame.

In additional or alternative examples, the at least one selected video may comprise metadata, indicating e.g. motion vectors associated with different regions within the frames of the at least one video, and this metadata may be used to determine motion associated with one or more frames, and the score indicating motion of at least some frames may therefore be determined based on this metadata.

In some examples, the score indicating movement may correspond to a z-score. This may involve, for example, determining a mean and standard deviation of the movement occurring across frames (e.g. between successive pairs) for a portion of the video. For a given frame, the z-score may be determined by comparing the movement associated with that frame (calculated as above) relative to the mean and standard deviation for the corresponding video portion. A frame having a z-score that exceeds a threshold value may be identified as having a high excitement level.

Alternatively or in addition, the statistical analysis performed on the video may comprise determining, for at least some frames in a respective portion of the video, a score indicating changes in the value of the A and or B channels of the LAB colour space for each pixel of those frames, relative to one or more other frames in a respective portion of the video. Again, changes in the values of the A and or B colour channels for each pixel may be determined on a per-frame basis.

It may be advantageous to look at changes in values of pixels in the LAB colour space as opposed to the RGB colour space for two reasons. Firstly, the LAB colour space is more perceptually uniform than the RGB colour space, meaning that a change in e.g. 10 points is relatively uniform in each direction. Therefore, substantial changes in the A and or B channels for a given pixel will be indicative of an interesting event occurring within the video. Secondly, video games often have changing lighting conditions, which may not necessarily be indicative of a particularly exciting moment occurring within a video game. The use of the LAB colour space allows more weight to be given to pure colour changes as opposed to lighting changes, when determining an excitement level associated with a given frame. An example of the LAB colour space and the respective A and B channels, and their respective values is shown in FIG. 6.

In some examples, the score indicating changes in the value of the A and or B channels for each pixel may similar to that described previously in relation to motion. For example, for each frame, the A and or B colour values of each pixel may be compared relative to the corresponding pixel in a preceding and or succeeding frame, and the difference in A and or B values across these frames may be used to determine a score for a current frame. A frame suddenly turning from e.g. yellow to blue would result in a high score for colour changes in the B channel, for example.

In some examples, the analysis may involve determining two scores, one for the changes in each of the respective A and B colour channels for the pixels in a given frame (referred to herein as L(A)B and LA(B)inter-frame scores respectively). These scores provide an indication of the colour changes between consecutive frames, which is generally indicative of action occurring within a given scene. The higher the score (or scores) is (or are) for a given frame, the higher the excitement level that is likely to be associated with that frame.

In some examples, the L(A)B and LA(B) inter-frame scores may correspond to z-scores. These may be determined in a similar manner to the z-scores for movement. That is, for each portion of the video, a mean and standard deviation for changes in the A and or B channels across the portion may be determined. For each frame in a respective portion, a z-score may be determined based on the changes in the A and or B channels for that frame (calculated as above), relative to the mean and standard deviation of the A and or B changes across the portion. A frame having an L(A)B and or LA(B) z-score that exceeds a threshold value may be identified as having a high excitement level.

It will be appreciated that the changes the RGB values of each pixel for a given frame may be used, and that this is ultimately at the discretion of a designer.

In yet additional or alternative examples, the statistical analysis performed on the video may involve determining a score indicating a deviation in the value of the A and or B channels of the LAB colour space for the pixels in at least some the frames, relative to a 'mean frame' representative of a portion of the video. The determination of this score, may involve, for example, determining a mean value for at least some of the pixels in the A and or B colour channels across a plurality of frames in the respective portion of the video (i.e. 'mean frame'), and then determining for each individual frame, a deviation in the pixel values in the A and or B colour channels, relative to corresponding pixels in the 'mean frame'. This deviation may then be used to determine an L(A)B and LA(B)score for each frame.

The portion of the video may correspond to the portion that the video has been divided into based e.g. on an arbitrary division time, or e.g. known length of different video clips that have been selected for matching with the imported audio track. Generally, the larger the deviations in pixel values for a given frame relative to the mean frame, the more indicative that exciting action is occurring within that frame.

In some examples, the L(A)B and LA(B) score may correspond to z-scores. This may involve, for example, determining a mean L(A)B frame and or mean LA(B) frame, representative of the mean A and or B values for the pixels across a plurality of frames in a respective portion of the video. Then, for each frame in the portion of video, a difference between the pixel values in the A and or B channels may be determined relative to corresponding pixels in the relevant mean frame. The mean and standard deviation of the differences across the frames in the video portion may then be determined. The z-score for each frame may be calculated by comparing the difference in A and or B channel for the current frame, relative to the overall mean and standard deviation of the difference for the respective video portion. A high z-score is indicative that there is a high level of colour change and therefore high level of exciting content.

It will be appreciated that one or more of the scores mentioned above may be determined and combined so as to determine an overall score for a frame, indicative of an excitement level associated with that frame. In some examples, it may be that a movement score, LA(B) inter-frame score, L(A)B inter-frame score, L(A)B score and LA(B) score is determined for each individual frame. As described above, each of these scores may correspond to a respective z-score. An excitement level may be determined for a given frame based on e.g. a weighted sum of these scores, followed by a smoothing operation, using e.g. a Savitzky-Golay filter.

Hence more generally a video frame may be considered exciting if it has a parameter level that is a predetermined amount above a threshold (e.g. a mean parameter level, or a preset parameter level) for a predetermined number of image parameters (for example, the five z-scores above), or the combined parameter levels of the predetermined number of image parameters are a predetermined amount above a predetermined combined threshold (such as a weighted sum of threshold values).

In some examples, each frame may be assigned an identifier indicating whether that frame is of a high or excitement level. A frame may be assigned an identifier indicating that it is of a high excitement level if the overall score (i.e. combined and smoothed score) exceeds a threshold value. Conversely, a frame may be assigned an identifier indicating that it is of a low excitement level if the overall score associated with that frame is less than a threshold score. In other examples, the overall score may be used as an explicit indication of excitement level, with higher overall scores corresponding to higher excitement levels associated with those frames.

In some examples, identifying frames as having a low excitement level may involve identifying a plurality of successive frames, e.g. 80 frames, for which the overall score is less than a threshold score. Generally, a low overall score will be indicative of little movement, little changes in colour and very average colours associated with that frame.

Figure 7:
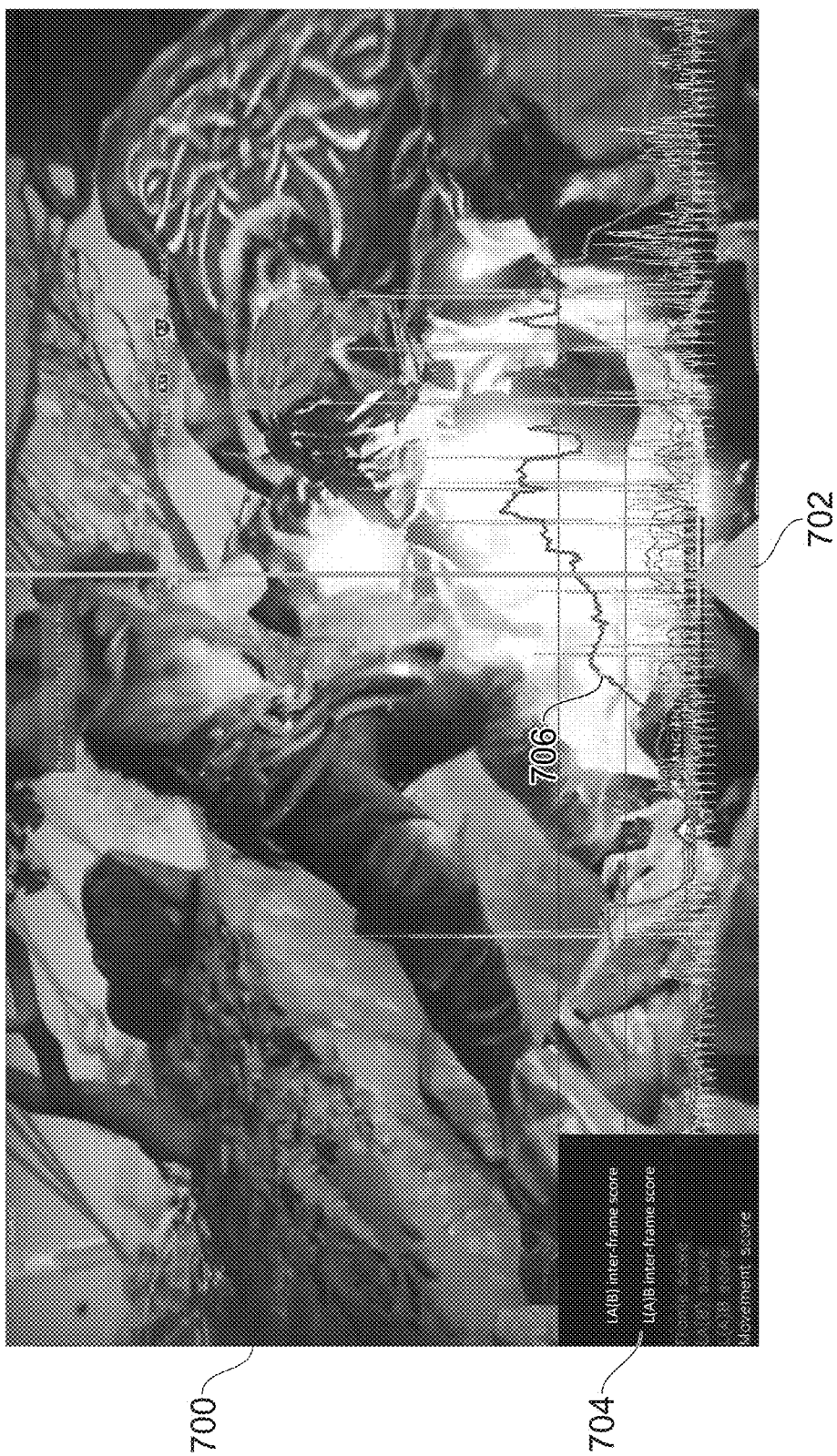
FIG. 7 shows an example of a frame of video game footage and the respective scores determined for that frame.

FIG. 7 shows an example of a graph corresponding to the z-scores calculated for each frame in a portion of video corresponding to the video game God of War®. In FIG. 7, the green arrow 702 represents a current point in time, corresponding to the frame 700, in which the character Kratos® is shown (as a background to the graph) as performing an attack. The individual scores are represented as different colours, as indicated at key 704. It can be seen in FIG. 7 that the L(A)B and LA(B) scores are raised at the time indicated by arrow 702, and that there are peaks in the inter-frame L(A)B and L(B)A scores before and after this time. In FIG. 7, the overall score, i.e. the combined score is indicated by graph 706. The combined score has been smoothed to reduce the spikiness of the graph and to prevent large single frame spikes in one or more scores overriding a sustained period of excitement.

Matching the Portions of Video with Corresponding Portions of Audio

Returning to FIG. 2, at a fifth step S205, at least some portions of the at least one video are matched with respective portions of the audio track based on a correspondence in excitement level. At a high level, this corresponds to matching portions of the video comprising frames identified as having a high (or low) excitement level with corresponding portions of the audio that have been identified as having a high (or low) excitement level.

It will be recalled that, following the statistical analysis performed on the audio track, the start and end times of each portion of the audio track (which may each comprise e.g. a bar of 4 beats) is known and each of these portions may have been assigned an identifier indicating an excitement level (which may be a binary 'high' or 'low'). In some examples, the start and end time of each portion may correspond to an identified beat (e.g. start on beat n, end on beat n+3).

Following the statistical analysis performed on the at least one video, at least some of the frames of each portion of video will be assigned an identifier indicating whether they are of a high or low excitement level. In the case of low excitement levels, a group of frames may be identified as having such a level.

It will be appreciated that in some embodiments, the excitement levels for both the portions of the audio track and frames of the video may be variable (i.e. non-binary), and so the matching may be based on a similarity in value. For example, one or more frames identified as having a maximal excitement level may be used to generate a video clip that is then matched to a corresponding portion of the audio, also identified as having a maximal excitement level.

To match the portions of audio with corresponding portions of the video, the method may comprise generating video clips from portions of the at least one video and matching these video clips to corresponding portions of the audio track. The generated video clips may correspond to highlights (including one or more frames identified as having a high excitement level) or lowlights (plurality of successive frames identified as having a low excitement level).

The highlight video clips may be generated by identifying a portion of the at least one video that comprises one or more frames identified as having a high excitement level, and generating a clip that corresponds in duration to a portion of the audio track also identified as having a high excitement level. This may be repeated until each portion of the audio track having a high excitement level has been matched with a corresponding highlight video clip.

In some examples, a highlight video clip may correspond in duration to a bar (e.g. 4 beats) of the audio track. This may be appropriate where e.g. the song has 4/4 timing signature and therefore each portion (e.g. bar) is of the same length. In other examples, the duration of each video clip may be variable, depending on (and corresponding to) the portion of the audio track with which that video clip is to be matched.

The duration of the video clip may be adjusted such that at least one of the frames identified as having a high excitement level (or a maximal excitement level) is synchronized with one of the beats of the corresponding portion of the audio track (e.g. the second beat in a bar). As mentioned previously, there may be a step of identifying beats within the audio track, and if the timing of these beats is known, a given frame within a video clip can be aligned with this beat. This alignment may be performed automatically as part of the video clip generation process.

Furthermore, if the start and end of the audio portions are defined by different beats, and different video clips are to be matched to different portions of the audio track, this can be used to ensure that transitions between different video clips are cut to the beat. For example, it may be that a highlight clip is cut to begin on beat 1 and end on beat 4, and a lowlight clip is cut to begin on beat 4 and end on beat 12. An appropriate fading may be applied where two different video clips are cut to be displayed on the same beat. Generally, transitions between different video clips are less jarring when occurring on the beat.

For lowlight video clips, video clips may be generated from portions of the video for which a plurality of successive frames have been identified as having a low (or lower) excitement level. A lowlight video clip may be generated so as to correspond in duration to a corresponding portion of the audio track identified as having a low excitement level. For most audio tracks, less exciting periods will last longer than exciting periods, and so it may be that portions of the audio track identified as having a low excitement level are longer (or comprises multiple portions) in duration than portions of the audio track identified as having a high excitement level. This may be repeated until each portion of the audio track having a low excitement level has been matched with a corresponding lowlight video clip. If the audio track has a regular structure, it may be that lowlight clips are all generated so as to have the same duration (corresponding to calmer moments within the audio track having the same or similar durations).

It will be appreciated that in some examples, it may be desirable to impose a lower limit on the duration of each video clip, so as to avoid an excessive amount of jumping between different video clips. Thus, in some examples, the video clips may be generated in accordance with a duration distribution, defining a minimum duration for highlight and lowlight video clips respectively. The minimum duration may correspond to e.g. a multiple of the duration of one or more audio portions. For example, highlight clips may be constrained to having a duration of at least 4 beats whereas lowlight clips may be constrained to having a duration of at least 8 beats.

The order in which different video clips are generated and matched to corresponding portions of the audio track may be random, pre-determined, or determined dynamically.

In examples where multiple different videos are obtained and analysed at steps S202 and S204, the pre-determined order may be defined such that each subsequent portion of the audio track is matched to a video clip generated from a different video. It will be appreciated that this will only be possible when there are a sufficient number of highlight and lowlight moments occurring across the different videos. In some examples, it may be that video clips generated from the same video must be separated by at least two different video clips generated from different videos. By controlling the order in which content from different videos may appear, a more varied and engaging final video can be created.

In some examples, the pre-determined order may be chronological. For example, video clips may be generated on a chronological basis, with earlier portions of the at least one video being used to generate video clips before later portions of the least one video. The clips generated from earlier portions of the at least one video may be matched to earlier corresponding portions of the audio track. In this way, the final video will show highlight and lowlight moments occurring in the order in which they unfolded whilst the player was playing one or more video games. This may be desirable where a player wishes to get an overview of their previous play in e.g. completing the story mode in a single player game or winning e.g. a sports tournament.

In yet further or alternative examples, the selection of video clips for matching with corresponding portions of the audio track may be based on information associated with the game to which the at least one video relates. This metadata may be encoded with the at least one video (or respective portions thereof). The metadata may define a game from which the at least one video relates, and this information may be used to ensure that footage from a sufficient different number of games is used in creating the final video.

In some examples the metadata may define in-game state information such as e.g. a level, match, whether the player won or lost, made a kill, scored a goal, etc. and this information may be used to define an order in which different video clips are generated and matched to corresponding portions of the audio track. For example, it may be that video clips corresponding to a player winning a final match or game are purposively matched with an exciting part of the audio track occurring later in the audio track (e.g. a key change occurring for the final chorus of a song).

At a sixth step S206, a composite video (in other words, a combined audio-visual content) that includes at least some portions of the video matched to respective portions of the audio track is generated. This video corresponds to a music video in which different portions of video game footage have been matched to an audio track (e.g. song) that the player has selected. Once assembled, the player may be notified that the music video is ready for playback. This may be in the form of e.g. a system notification displayed on the home screen of the video game console home menu, or a notification sent to the user's phone via a video game application. The user may then be provided with an option to share this video to social media or a video hosting service.

In some examples, the method may further comprise an additional step (not shown) of displaying the composite video to the user. It may be for example that the composite video is automatically shown to the player at the end of a video gaming session, when e.g. video from that session has been used in creating the music video. In such a case, it may that the 15 minutes of video cached in the temporary buffer is used in creating e.g. a 30 s highlight video that is matched to a selected audio track. In some examples, it may be that the music video is automatically created after an in-game event, such as e.g. a player completing a final level in a story mode of a video game. Displaying the composite video in either of these ways will require that the user selects a song before finishing the one or more video game sessions. Alternatively, a player may select a song after having completed one or more video game sessions, however this will mean that the player needs to wait for the music video to be assembled by the system.

It will be appreciated that, in some cases, there may be an insufficient number of video clips for matching with corresponding portions of the audio track. For example, where there are too few frames corresponding to highlight moments across the at least one video for matching with a corresponding number of exciting moments identified in the audio track. In such cases, the method may comprise generating a truncated music video that includes a shorter version of the audio track matched with the video clips that were generated. The truncation may be based e.g. on the first X minutes of the song, a set number of successive low excitement and high excitement portions of the song, or a portion of the song centred on a portion identified as having a high (or maximal) excitement level.

It will be appreciated that any of the method steps described previously may be carried out by a computer system comprising a computer readable medium having computer executable instructions that are adapted to cause the system to perform any of said method steps.

FIG. 8 schematically shows an example of a system 800 for generating audio-visual content from video game footage, in accordance with the present disclosure. The system 800 comprises an input unit operable to receive an audio track comprising music. The audio track may correspond to any of the audio tracks described previously in relation to FIG. 2. Generally, the audio track will have been selected by a user.

The input unit may also be operable to receive at least one video. In some embodiments, the system 800 may comprise separate units for the selected audio track and at least one video respectively. An example of such an embodiment is shown in FIG. 8, where the system 800 is shown as comprising audio input unit 802 and video input unit 804.

The at least one video may have been obtained in any one of the manners described previously, being e.g. automatically or manually captured at a video game playing device or imported from a video hosting website. In the latter case, the video hosting website may provide videos (or video clips) categorised according to game and or in-game event. A user may select one or more of these videos for use in assembling the composite video. This may be useful in assisting e.g. YouTubers with creating intros and outros, allowing them to use content that they have not yet encountered themselves whilst playing a given video game.

The system 800 further comprises an audio analyser 806 configured to receive an input from the input unit (or audio input unit) and to perform statistical analysis on the audio track so as to determine an excitement level associated with at least some portions of the audio track.

In some examples, the system 800 may comprise a beat detection unit (not shown) operable to detect beats in the audio track and to split the audio track into portions based on the beat detection. The portions may be defined such that each portion comprises at least two successive identified beats. In preferred examples, each portion of the audio track corresponds to a bar. The start and end of each portion may be defined by respective beats. The beat detection may form part of the audio analyser 806 or be a separate component (not shown) that precedes the audio analyser 806. The audio analyser 806 may be configured to perform the statistical analysis on the audio track, using the audio track as partitioned based on the beat analysis.

In some examples, the audio analyser 806 may be configured to generate a spectrogram of each portion of the audio track and determine, for each portion, whether the power of the audio track at a plurality of different frequency intervals deviates from a mean power of the audio track at those frequencies by more than a threshold amount. As described previously (see 'Audio Statistical Analysis'), this may involve determining a z-score for a plurality of frequency intervals for each portion of the audio track, and determining an overall score for that portion, representative of the fullness. The audio analyser 806 may be configured to determine such scores for each portion of the audio track, and based thereon, determine an excitement level associated with different portions of the audio track. Generally, the audio analyser 806 may be configured to perform any of the statistical audio analysis described previously.

The audio analyser 806 may be configured to assign an identifier to respective portions of the audio track indicating whether those portions are of a high or low excitement level. A portion of the audio track may be assigned an identifier indicating a high excitement level if the power of that portion at a plurality of different frequency intervals deviates from the mean power of the audio track at those frequencies by more than a threshold amount. Put more simply, the audio analyser 806 may determine whether the overall score associated with a portion of the audio track exceeds a threshold value, and if so, assign an identifier to that portion, indicating that the portion is of a high excitement level. If this is not the case for a given portion of the audio track, the audio analyser 806 may assign an identifier to that portion, indicating that it is of a low excitement level.

The system 800 further comprises a video analyser 808 configured to receive an input from the input unit (or dedicated video input unit), and to perform statistical analysis on the at least one video so as to determine an excitement level associated with at least some of the at least one video.

In some examples, the system 800 may comprise a video segmentation unit operable (not shown) to segment the at least one video into respective portions. As described previously, this may involve splitting the at least one video into portions based on an arbitrary time interval, e.g. into 12-minute portions. Additionally, or alternatively, the segmentation may be based on markers, such as e.g. file names or identifiers indicating that a given portion of video or indeed video relates to a different video game or moment within a given video game. The video segmentation unit may form part of the video analyser 808 or a separate component that precedes the video analyser 808, for example.

The video analyser 808 may be configured to determine a score associated with at least some frames in a respective portion of the video, the score indicating at least one of:

motion associated with that frame relative to a different frame in the respective portion of the video;

ii. changes in the values of the A and or B channels of the LAB colour space of that frame relative to a different frame in the respective portion of the video;

iii. a deviation in the values of the A and or B channels of the LAB colour space of that frame relative to a mean frame representative of that portion of the video.

The video analyser 808 may be configured to determine this score in any of the manners described previously (see 'Video Statistical Analysis'). In one example, this may involve determining one or more individual scores representing motion, LA(B) inter-frame changes, L(A)B inter-frame changes, LA(B) changes relative to a mean frame and L(A)B changes relative to a mean frame. As described before, one or more of these individual scores may be combined (using e.g. a weighted sum) so as to determine an overall score, from which an excitement level associated with a given frame can be determined.

In some examples, the video analyser 808 may be operable to determine an excitement level associated with each frame in a respective portion of the video based on whether the score associated with that frame is equal to or exceeds a threshold score. A frame may be identified as being of a high excitement level if the associated score is equal to or higher than a threshold score, and of a low excitement level otherwise. The video analyser 808 may be configured to assign identifiers to the at least some frames, indicating whether those frames are of a high or low excitement level.

In FIG. 8, it can also be seen that the system comprises a combiner 810 operable to receive inputs from the audio analyser 806 and video analyser 808. The combiner 810 is configured to match at least some portions of the at least one video with at least some portions of the audio track, based on a correspondence in determined excitement level. Based on this matching, the combiner 810 is configured to generate a composite video that includes at least some portions of the video matched with at least some portions of the audio track. The term 'composite video' is used herein interchangeably with the term 'music video'—i.e. it corresponds to a final video made up of a plurality of portions of one or more videos, wherein the relative position of those portions within the final video is based on a correspondence in excitement level between those portions and portions of the audio track.

In some examples, the system 800 may comprise a video clip generator (not shown) operable to generate video clips from at least one of the respective portions of the at least one video for matching with at least one of the portions of the audio track. The video clip generator may be configured to determine a duration of at least one of the portions of the audio track identified as having a corresponding excitement level, and to generate a video clip having at least that duration. This ensures that each video clip is of the same duration as the respective portion of the audio track (e.g. a bar comprising 4 beats) with which that video clip is to be matched. The combiner 810 may then be configured to match these generated video clips with the corresponding portion of the audio track.

The video clip generator may be configured to generate video clips comprising frames identified as having a high-excitement level (so-called highlight clips), and to match these clips with corresponding portions of the audio track identified as having a high excitement level. In some examples, the video clips may be generated such that a frame identified as having a high excitement level is synchronized with at least one of the beats in the corresponding portion of the audio track with which that clip is to be matched. The highlight video clips may be generated in any of the manners described previously in relation to FIGS. 2-7.

The video clip generator may also be configured to generate video clips comprising a plurality of successive frames identified as having a low excitement level (so-called lowlight clips). The combiner may then be configured to match these clips with corresponding portions of the audio track identified as having a low excitement level (e.g. by way of identifiers assigned thereto). This ensures that less exciting moments of video game footage are output at the same time as calmer moments within the audio track.

Generally, the video clips may be generated in any of the manners described previously in relation to FIGS. 2-7.

In some examples, the combiner 810 may be configured to combine portions of the at least one video with respective portions of the audio track such that each video clip begins on a different beat of the audio track. For example, the combiner 810 may combine clips with portions of the audio track such that e.g. clip 1 starts on beat 1 and ends on beat 4, and clip 2 begins on beat 4 and ends on beat 8. This ensures that different videos are cut to the beat. In some examples, this may be a natural outcome of the way in which different video clips have been generated (since their duration will depend on the duration of the portion of the audio track with which they have been matched).

The system 800 may further comprise a display device (not shown) for outputting the composite video for display.

It will be appreciated that one or more components of the above described system 800 may be implemented at the same or different devices. In some examples, one or more of these components may be implemented at a video game playing device. For example, the input unit may be located at the video game playing device and receive video(s) captured by the video game playing device. The audio track may also be stored at or downloaded to the video game playing device and received by the input unit in this manner.

Once obtained, the audio and video analysis, as well as combination, may be performed at e.g. a server that is in communication with the video game playing device. It may be, for example, that video and audio analysis is somewhat intensive in terms of the computing resources required, and so may benefit from being performed using e.g. the cloud, as opposed to the video game playing device (which may already being used by a player to render video content). Once the video game footage has been assembled into a music video, this music video may be provided to the user. This may involve e.g. transmitting the assembled video to the player's video game playing device, or making the video available through an application (e.g. the 'PS app') or a web page that the player can access via one of their devices. In preferred examples, the video and audio analysis is performed automatically, with no user intervention required in terms of creating different video clips and matching those to the appropriate music.

It will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating audio-visual content from video game footage, the method comprising:
   obtaining a user-selected audio track comprising music;
   obtaining at least one video generated by at least one video game playing device during the playing of at least one video game, the video comprising a plurality of frames;
   performing statistical analysis on the audio track so as to determine an excitement level associated with at least some portions of the audio track;
   performing statistical analysis on the at least one video so as to determine an excitement level associated with at least some portions of the at least one video;
   matching, based on a correspondence in determined excitement level, at least some portions of the at least one video with at least some portions of the audio track; and
   generating, based on the matching, a combined audio-visual content that includes the at least some portions of the video matched to respective portions of the audio track,
   wherein performing statistical analysis on the at least one video comprises determining, for each frame in a respective portion of the video, a respective score indicating at least one of:
      motion associated with that frame relative to a different frame in the respective portion of the video;
      changes in the value of the A and or B channels of the LAB color space of that frame relative to a different frame in the respective portion of the video;
      a deviation in the value of the A and or B channels of the LAB color space of that frame relative to a mean frame representative of the respective portion of the video.

2. The method according to claim 1, further comprising separating the audio track into respective portions based on beat detection, each portion comprising at least two beats.

3. The method according to claim 2, wherein performing statistical analysis on the audio track comprises:
   generating a spectrogram of each respective portion of the audio track;
   determining a respective mean power and a standard deviation of the power of the audio track at a plurality of different frequency intervals; and
   wherein determining an excitement level associated with at least some portions of the audio track comprises determining, for those portions, a deviation of the power at the plurality of different frequency intervals from the mean power of the audio track at the plurality of frequency intervals.

4. The method according to claim 3, wherein determining an excitement level associated with a respective portion of the audio track comprises determining z-scores associated with the power of that portion at the plurality of different frequency intervals and determining whether the combination of z-scores for that portion exceeds a threshold value.

5. The method according to claim 4, wherein each portion of the audio track is assigned an identifier indicating whether it has a high or low excitement level, the excitement level being determined as high if the combination of z-scores for that portion is equal to or exceeds a threshold value and low if the combination of z-scores is less than the threshold value.

6. The method according to claim 2, further comprising adjusting the duration
   of at least some portions of the video comprising frames identified as having a high excitement level such that at least one of the frames identified as having a high excitement level in that portion of video is synchronized with one of the beats in the corresponding portion of the audio track.

7. The method according to claim 1, further comprising determining, for each portion of the video, whether any of the frames of that portion have a score that is equal to or exceeds a threshold score; and
   wherein frames having a score that is equal to or exceeds the threshold score are assigned an identifier indicating that those frames have a high excitement level.

8. The method according to claim 7, further comprising determining, for each portion of the video, whether a plurality of successive frames in that portion have a score that is below the threshold score; and
   wherein the plurality of successive frames having a score that is less than the threshold score are assigned an identifier indicating that those frames have a low excitement level.

9. The method according to claim 7, wherein matching at least some portions of the at least one video with respective portions of the audio track comprises:
   matching portions of the at least one video comprising frames identified as having a high excitement level with respective portions of the audio track identified as having a high excitement level; and
   matching portions of the at least one video comprising a plurality of successive frames identified as having a low excitement level with respective portions of the audio track identified as having a low excitement level.

10. The method according to claim 9, further comprising adjusting the duration
    of at least some portions of the video comprising frames identified as having a high excitement level such that at least one of the frames identified as having a high excitement level in that portion of video is synchronized with one of the beats in the corresponding portion of the audio track.

11. The method according to claim 1, further comprising obtaining a plurality of videos, each video corresponding to the video generated by one or more video game playing devices during different video game playing sessions; and
matching portions of at least some of the videos with respective portions of the audio track in accordance with a pre-determined order, the pre-determined order defining an order in which portions of different videos are to appear in the combined audio-visual content.

12. A non-transitory computer readable medium having stored thereon computer executable instructions adapted to cause a computer system to perform a method comprising:
obtaining a user-selected audio track comprising music;
obtaining at least one video generated by at least one video game playing device during the playing of at least one video game, the video comprising a plurality of frames;
performing statistical analysis on the audio track so as to determine an excitement level associated with at least some portions of the audio track;
performing statistical analysis on the at least one video so as to determine an excitement level associated with at least some portions of the at least one video;
matching, based on a correspondence in determined excitement level, at least some portions of the at least one video with at least some portions of the audio track; and
generating, based on the matching, a combined audio-visual content that includes the at least some portions of the video matched to respective portions of the audio track,
wherein performing statistical analysis on the at least one video comprises determining, for each frame in a respective portion of the video, a respective score indicating at least one of:
motion associated with that frame relative to a different frame in the respective portion of the video;
changes in the value of the A and or B channels of the LAB color space of that frame relative to a different frame in the respective portion of the video;
a deviation in the value of the A and or B channels of the LAB color space of that frame relative to a mean frame representative of the respective portion of the video.

13. A system for generating audio-visual content from video game footage, the system comprising:
an input unit operable to receive a user-selected audio track comprising music and at least one video generated by a video game playing device during the playing of at least one video game;
an audio analyser operable to perform statistical analysis on at least some the audio track so as to determine an excitement level associated with at least some portions of the audio track;
a video analyser operable to perform statistical analysis on the at least one video so as to determine an excitement level associated with at least some portions of the at least one video;
a combiner configured to match at least some portions of the at least one video with respective portions of the audio track based on a correspondence in excitement level, and to generate, based on the match, a combined audio-visual content comprising the at least some portions of the video matched with respective portions of the audio track,
further comprising a video segmentation unit operable to segment the at least one video into the respective portions; and
wherein the video analyser is configured to determine a score associated with each frame in a respective portion of the video, the score indicating at least one of:
motion associated with that frame relative to a different frame in the respective portion of the video;
changes in the values of the A and or B channels of the LAB color space of that frame relative to a different frame in the respective portion of the video;
a deviation in the values of the A and or B channels of the LAB color space of that frame relative to a mean frame representative of that portion of the video.

14. The system according to claim 13, further comprising a beat detection unit operable to detect beats in the audio track and to split the audio track into portions based on the beat detection, each portion comprising at least two beats; and
wherein the audio analyser is configured to generate a spectrogram of each portion of the audio track and determine, for each portion, whether the power of the audio track at a plurality of different frequency intervals deviates from a mean power of the audio track at those frequencies by more than a threshold amount.

15. The system according to claim 14, wherein the audio analyser is configured to assign an identifier to respective portions of the audio track indicating whether those portions are of a high or low excitement level; and
wherein the audio analyser is configured to assign an identifier indicating that a respective portion of the audio track is of a high excitement level if the power of that portion at the plurality of different frequency intervals deviates from the mean power of the audio track at those frequencies by more than a threshold amount, or is of a low excitement level otherwise.

16. The system according to claim 14, wherein the start and endpoints of each portion of the audio track are defined by respective beats; and
wherein the combiner is configured to combine portions of the at least one video with respective portions of the audio track such that each portion of the video begins on the first beat of the corresponding portion of the audio track.

17. The system according to claim 13, wherein the video analyser is operable to determine an excitement level associated with each frame in a respective portion of the video based on whether the score associated with that frame is equal to or exceeds a threshold score; and
wherein the video analyser is configured to assign an identifier to each frame indicating whether that frame is of a high or low excitement level.

18. The system according to claim 17, wherein the video analyser is configured to assign an identifier indicating that a respective frame is of a high excitement level if the score associated with that frame is equal to or exceeds the threshold score; and
wherein the video analyser is configured to assign an identifier indicating that a respective frame is of a low excitement level if the score associated with that frame is below the threshold score.

19. The system according to claim 13, further comprising a video clip generator operable to generate video clips from at least one of the respective portions of video for matching with at least one of the respective portions of audio track; and wherein the video clip generator is configured to determine a duration of at least one of the respective portions of audio track and to generate a video clip having at least that duration.

20. The system according to claim 19, wherein the video clip generator is configured to generate video clips comprising frames identified as having a high excitement level; and wherein the combiner is configured to match video clips comprising frames identified as having a high excitement level with corresponding portions of the audio track identified as having a high excitement level.

21. The system according to claim 20, wherein the video clip generator is configured to determine timing information associated with the beats of the respective portions of audio track; and wherein the video clip generator is configured to generate video clips comprising at least one frame identified as having a high excitement level that is synchronized with at least one of the beats in a respective portion of the audio track.

22. The system according to claim 20, wherein the video clip generator is configured to generate video clips comprising a plurality of successive frames identified as having a low excitement level; and wherein the combiner is configured to match video clips comprising successive frames identified as having a low excitement level with corresponding portions of the audio track identified as having a low excitement level.

23. The system according to claim 13, wherein the input unit is operable to obtain plural videos, each video corresponding to a video generated during different video game playing sessions by the same player or different players.

24. The system according to claim 23, wherein the combiner is configured to determine whether a portion of at least one of the videos has already been matched to a respective portion of the audio track, and if a portion from that video has already been matched to a respective portion of the audio track, select a portion of a different video for matching with a subsequent portion of the audio track.

\* \* \* \* \*